US012785243B2

(12) United States Patent
Yoshikawa et al.

(10) Patent No.: US 12,785,243 B2
(45) Date of Patent: Nov. 3, 2026

(54) COMPOSITE RESONATOR AND RADIO WAVE REFRACTING PLATE

(71) Applicant: KYOCERA CORPORATION, Kyoto (JP)

(72) Inventors: Hiromichi Yoshikawa, Yokohama (JP); Nobuki Hiramatsu, Yokohama (JP)

(73) Assignee: KYOCERA CORPORATION, Kyoto (JP)

( * ) Notice: Subject to any disclaimer, the term of this patent is extended or adjusted under 35 U.S.C. 154(b) by 227 days.

(21) Appl. No.: 18/715,740

(22) PCT Filed: Dec. 2, 2022

(86) PCT No.: PCT/JP2022/044589
§ 371 (c)(1),
(2) Date: Jun. 3, 2024

(87) PCT Pub. No.: WO2023/106238
PCT Pub. Date: Jun. 15, 2023

(65) Prior Publication Data
US 2025/0046979 A1 Feb. 6, 2025

(30) Foreign Application Priority Data
Dec. 7, 2021 (JP) ................................ 2021-198812

(51) Int. Cl.
*H01P 7/00* (2006.01)
*H01P 7/08* (2006.01)
*H01Q 15/00* (2006.01)

(52) U.S. Cl.
CPC ................ *H01P 7/082* (2013.01); *H01P 7/00* (2013.01); *H01Q 15/00* (2013.01); *H01Q 15/0006* (2013.01)

(58) Field of Classification Search
CPC .... H01Q 15/002; H01Q 15/008; H01Q 15/00; H01Q 15/0006; H01P 7/00; H01P 7/08;
(Continued)

(56) References Cited

U.S. PATENT DOCUMENTS 9,136,609 B2 * 9/2015 Ando .................. H01Q 9/0407
2005/0212705 A1 9/2005 Legay et al.
(Continued)

FOREIGN PATENT DOCUMENTS

JP 2013062802 A 4/2013
JP 2015231182 A 12/2015
(Continued)

Primary Examiner — Stephen E. Jones
(74) Attorney, Agent, or Firm — HAUPTMAN HAM, LLP

(57) ABSTRACT

A composite resonator includes: a first conductor extending in a first plane direction; a second conductor separated from the first conductor in a first direction and extending in the first plane direction; a third conductor separated from the second conductor in the first direction and extending in the first plane direction; a fourth conductor separated from the third conductor in the first direction and extending in the first plane direction; and a plurality of connection conductors parallel to the first direction, the plurality of connection conductors being provided along a periphery of the first conductor, the second conductor, the third conductor, and the fourth conductor. The plurality of connection conductors are configured to electromagnetically connect the first conductor, the second conductor, the third conductor, and the fourth conductor.

7 Claims, 10 Drawing Sheets

(58) Field of Classification Search
CPC .. H01P 7/084; H01P 1/20381; H01P 1/20354; H01P 1/203
USPC .................................... 333/219; 343/700 MS
See application file for complete search history.

(56) References Cited

U.S. PATENT DOCUMENTS

| | | | | | |
|---|---|---|---|---|---|
| 2006/0044212 | A1 | 3/2006 | Wang et al. | | |
| 2013/0241770 | A1 | 9/2013 | Legay et al. | | |
| 2021/0257742 | A1 * | 8/2021 | Wu | H01Q 15/0013 | |
| 2023/0299450 | A1 * | 9/2023 | Zhang | H01P 1/20 | 333/202 |
| 2023/0327334 | A1 | 10/2023 | Hiramatsu et al. | | |
| 2024/0195078 | A1 * | 6/2024 | Yoshikawa | H01Q 17/00 | |

FOREIGN PATENT DOCUMENTS

| | | | |
|---|---|---|---|
| JP | 2022165403 | A | 10/2022 |
| KR | 1020070041763 | A | 4/2007 |
| KR | 1020100097318 | A | 9/2010 |
| KR | 1020110010938 | A | 2/2011 |

* cited by examiner

COMPOSITE RESONATOR AND RADIO WAVE REFRACTING PLATE

RELATED APPLICATIONS

The present application is a National Phase of International Application No. PCT/JP2022/044589 filed Dec. 2, 2022, which claims priority to Japanese Application No. 2021-198812, filed Dec. 7, 2021.

TECHNICAL FIELD

The present disclosure relates to a composite resonator and a radio wave refracting plate.

BACKGROUND OF INVENTION

A known technique involves controlling electromagnetic waves without using a dielectric lens. For example, Patent Document 1 describes a technique of refracting radio waves by changing parameters of respective elements in a structure including an array of resonator elements.

CITATION LIST

Patent Literature

Patent Document 1: JP 2015-231182 A

SUMMARY

A composite resonator according to the present disclosure includes: a first conductor extending in a first plane direction; a second conductor separated from the first conductor in a first direction and extending in the first plane direction; a third conductor separated from the second conductor in the first direction and extending in the first plane direction; a fourth conductor separated from the third conductor in the first direction and extending in the first plane direction; and a plurality of connection conductors parallel to the first direction, the plurality of connection conductors being provided along a periphery of the first conductor, the second conductor, the third conductor, and the fourth conductor, wherein the plurality of connection conductors are configured to electromagnetically connect the first conductor, the second conductor, the third conductor, and the fourth conductor.

A composite resonator according to the present disclosure includes: a first conductor extending in a first plane direction; a second conductor separated from the first conductor in a first direction and extending in the first plane direction; and a plurality of connection conductors parallel to the first direction, the plurality of connection conductors being provided along a periphery of the first conductor and the second conductor, wherein the plurality of connection conductors are configured to electromagnetically connect the first conductor and the second conductor to each other.

A radio wave refracting plate according to the present disclosure includes a plurality of composite resonators of the present disclosure, and the plurality of composite resonators are arranged in the first plane direction.

DESCRIPTION OF EMBODIMENTS

Embodiments of the present disclosure will be described in detail with reference to the drawings. The embodiments described below do not limit the present disclosure.

In the following description, an XYZ orthogonal coordinate system is set, and the positional relationship between respective portions will be described by referring to the XYZ orthogonal coordinate system. A direction parallel to an X-axis in a horizontal plane is defined as an X-axis direction, a direction parallel to a Y-axis orthogonal to the X-axis in the horizontal plane is defined as a Y-axis direction, and a direction parallel to a Z-axis orthogonal to the horizontal plane is defined as a Z-axis direction. A plane including the X-axis and the Y-axis is appropriately referred to as an XY plane, a plane including the X-axis and the Z-axis is appropriately referred to as an XZ plane, and a plane including the Y-axis and the Z-axis is appropriately referred to as a YZ plane. The XY plane is parallel to the horizontal plane. The XY plane, the XZ plane, and the YZ plane are orthogonal to each other.

Overview

Radio Wave Refracting Plate

Figure 1:
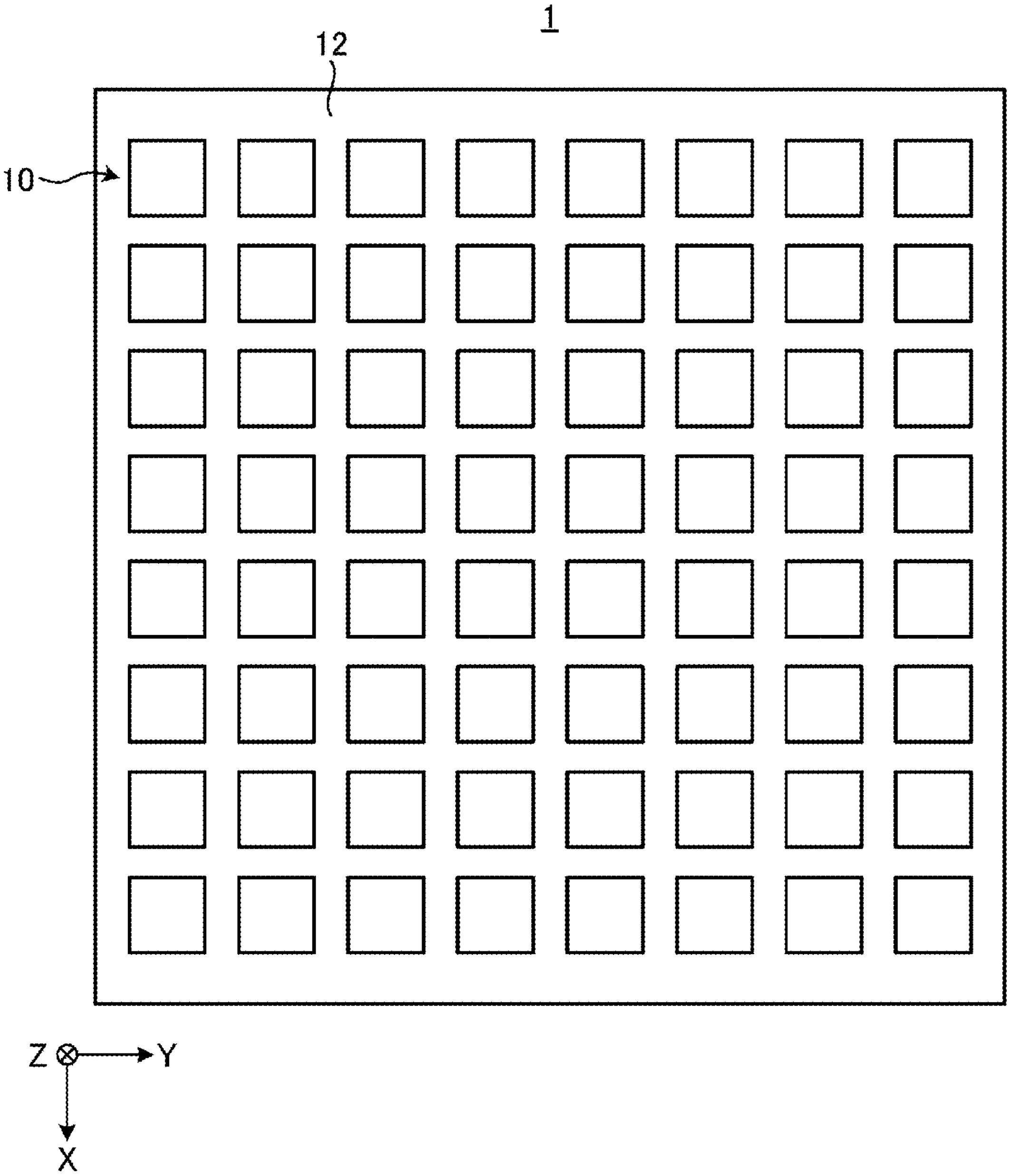
FIG. 1 is a diagram illustrating an overview of a radio wave refracting plate.

An overview of a radio wave refracting plate will be described with reference to FIG. 1. FIG. 1 is a diagram illustrating an overview of the radio wave refracting plate.

As illustrated in FIG. 1, a radio wave refracting plate 1 includes a plurality of unit structures 10 and a substrate 12.

The plurality of unit structures 10 are arranged in the XY plane direction. The XY plane direction may also be referred to as a first plane direction. That is, the plurality of unit structures 10 are arranged two-dimensionally. In the present embodiment, each of the plurality of unit structures 10 has a resonance structure. The structure of the unit structure 10 will be described later. The substrate 12 may be, for example, a dielectric substrate made of a dielectric body. That is, in the present embodiment, the radio wave refracting plate 1 is formed by two-dimensionally arranging the plurality of unit structures 10 having a resonance structure on the substrate 12 formed of a dielectric material.

First Embodiment

Figure 2:
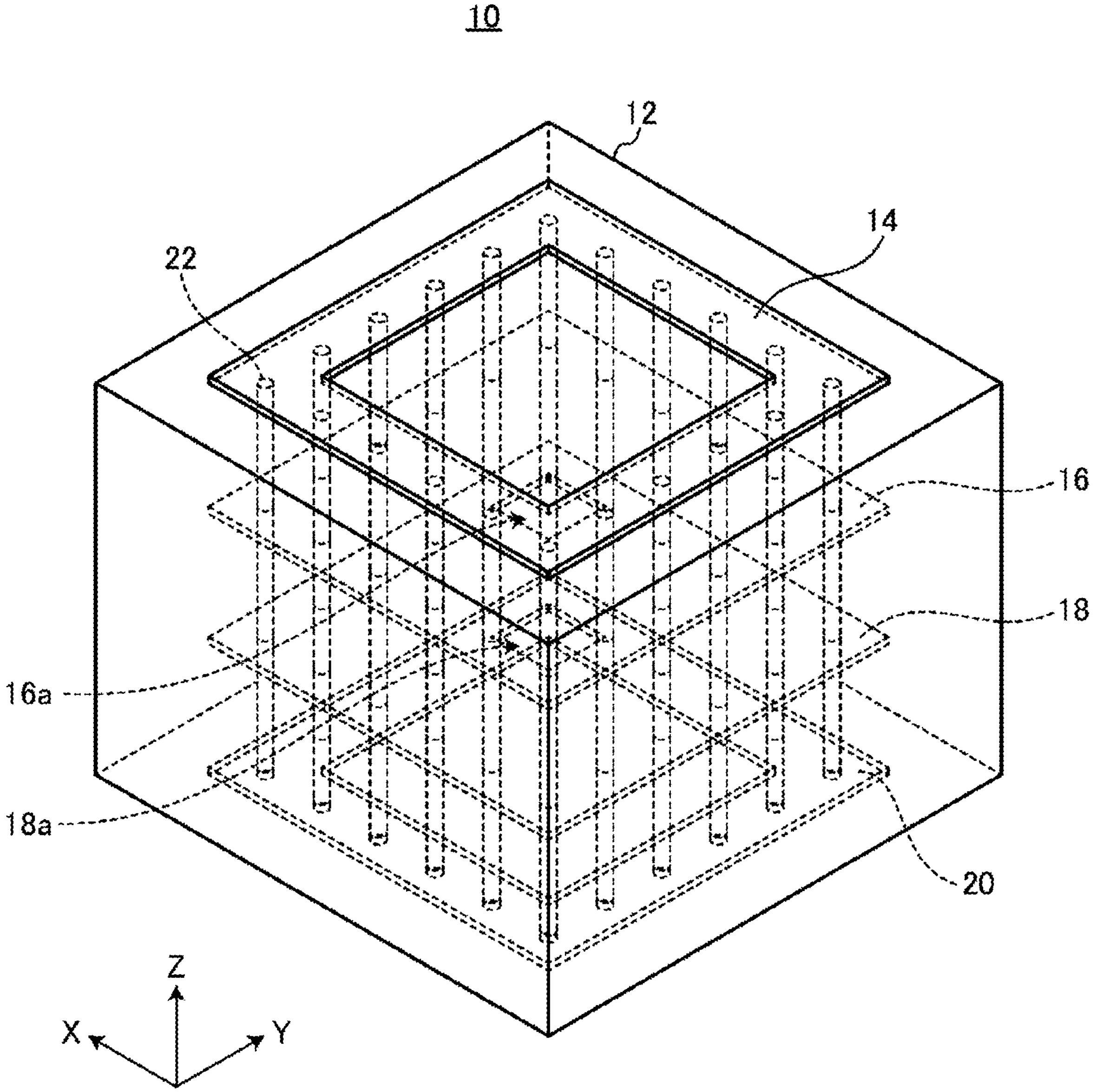
FIG. 2 is a diagram illustrating a configuration example of a unit structure according to a first embodiment.
Figure 3:
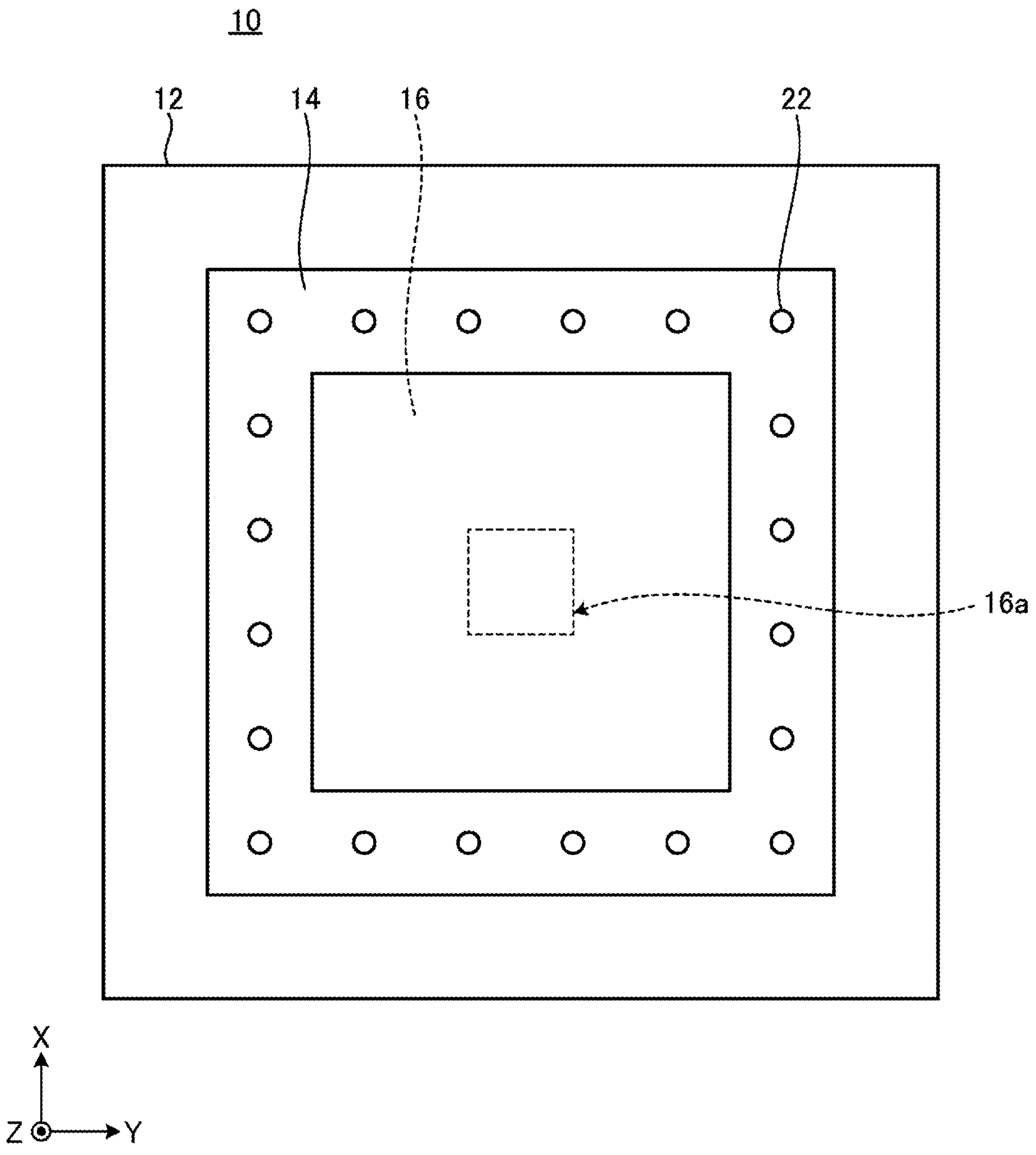
FIG. 3 is a top view of the configuration example of the unit structure according to the first embodiment.
Figure 4:
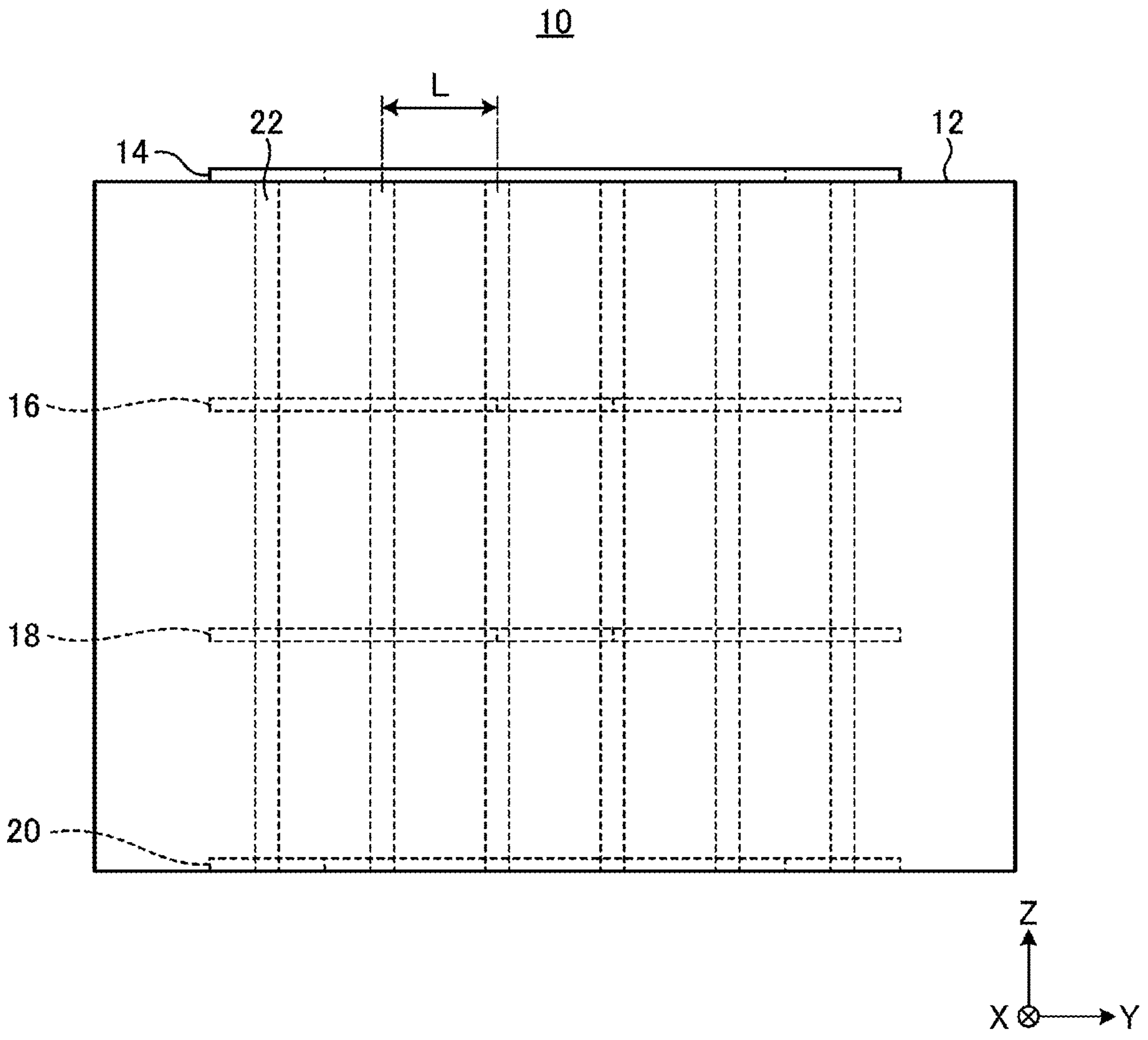
FIG. 4 is a side view of the configuration example of the unit structure according to the first embodiment.

A configuration example of the unit structure according to the first embodiment will be described with reference to FIGS. 2, 3, and 4. FIG. 2 is a diagram illustrating a configuration example of the unit structure according to the first embodiment. FIG. 3 is a top view of a configuration example of the unit structure according to the first embodiment. FIG. 4 is a side view of a configuration example of the unit structure according to the first embodiment.

As illustrated in FIG. 2, the unit structure 10 includes a first conductor 14, a second conductor 16, a third conductor 18, a fourth conductor 20, and a plurality of connection conductors 22. The unit structure 10 is a type of composite resonator.

The first conductor 14 may be arranged on the substrate 12, extending on the XY plane. The first conductor 14 may be, for example, a rectangular conductor formed in a frame shape. In the example illustrated in FIG. 2, the first conductor 14 is illustrated as a rectangular conductor formed in a frame shape, but the present disclosure is not limited thereto. The shape of the first conductor 14 may be, for example, a polygonal shape other than a circular shape formed in a frame shape and a rectangular shape formed in a frame shape. The shape of the first conductor 14 may be arbitrarily changed according to the design.

The second conductor 16 can be arranged on the substrate 12 to extend on the XY plane at a position away from the first conductor 14 in the Z-axis direction. The second conductor 16 may be, for example, a conductor formed in a rectangular shape. The second conductor 16 may be a reference conductor (for example, a ground conductor) of the unit structure 10. The second conductor 16 has a coupling hole 16*a* for magnetically or capacitively connecting the first conductor 14 and the second conductor 16. As illustrated in FIG. 3, the coupling hole 16*a* is formed, for example, in a central portion of the second conductor 16. The coupling hole 16*a* is smaller than the inner frame of the first conductor 14. The coupling hole 16*a* is formed in a rectangular shape, but the present disclosure is not limited thereto. In the example illustrated in FIG. 2, the second conductor 16 is illustrated as a rectangular conductor, but the present disclosure is not limited thereto. The shape of the second conductor 16 may be, for example, a circle or a polygon other than a rectangle. The shape of the second conductor 16 may be arbitrarily changed according to the design.

The third conductor 18 may be arranged on the substrate 12 to extend on the XY plane at a position away from the second conductor 16 in the Z-axis direction. The third conductor 18 may be, for example, a conductor formed in a rectangular shape. The third conductor 18 may be a reference conductor (for example, a ground conductor) of the unit structure 10. The third conductor 18 has a coupling hole 18*a* that magnetically or capacitively connects the second conductor 16 to the third conductor 18 and magnetically or capacitively connects the third conductor 18 to the fourth conductor 20. The coupling hole 18*a* is formed, for example, in a central portion of the third conductor 18. The coupling hole 18*a* has the same shape as the coupling hole 16*a*. In the example illustrated in FIG. 2, the third conductor 18 is illustrated as a rectangular conductor, but the present disclosure is not limited thereto. The shape of the third conductor 18 may be, for example, a circle or a polygon other than a rectangle. The shape of the third conductor 18 may be arbitrarily changed according to the design. The third conductor 18 may be formed in the same shape as the second conductor 16.

The fourth conductor 20 may be arranged on the substrate 12 to extend on the XY plane at a position away from the third conductor 18 in the Z-axis direction. The fourth conductor 20 may be, for example, a rectangular conductor formed in a frame shape. In the example illustrated in FIG. 2, the fourth conductor 20 is illustrated as a rectangular conductor formed in a frame shape, but the present disclosure is not limited thereto. The shape of the fourth conductor 20 may be, for example, a polygonal shape other than a circular shape formed in a frame shape and a rectangular shape formed in a frame shape. The shape of the fourth conductor 20 may be arbitrarily changed according to the design. The fourth conductor 20 may be formed in the same shape as the first conductor 14.

The first conductor 14, the second conductor 16, the third conductor 18, and the fourth conductor 20 have the same outer dimensions.

The connection conductor 22 electromagnetically connects the first conductor 14, the second conductor 16, the third conductor 18, and the fourth conductor 20 to each other. One end of the connection conductor 22 is electromagnetically connected to the first conductor 14, and the other end thereof is electromagnetically connected to the fourth conductor 20. The connection conductor 22 may be, for example, a via formed from the first conductor 14 to the fourth conductor 20 and parallel to the Z-axis direction. The connection conductor 22 is provided in a plurality along the periphery of the first conductor 14, the second conductor 16, the third conductor 18, and the fourth conductor 20. For example, the connection conductors 22 are provided at equal intervals along the periphery of the first conductor 14, the second conductor 16, the third conductor 18, and the fourth conductor 20. As illustrated in FIG. 4, an interval L between the connection conductors 22 adjacent to each other may be, for example, equal to or less than a wavelength of a radio wave received by the unit structure 10 from a base station or the like. The interval L is preferably, for example, equal to or less than a half wavelength of a radio wave received by the unit structure 10 from a base station or the like.

In the unit structure 10, the first conductor 14 and the second conductor 16 are magnetically or capacitively connected to each other. The first conductor 14 and the second conductor 16 constitute one resonator.

In the unit structure 10, the second conductor 16 and the third conductor 18 are magnetically or capacitively connected. The second conductor 16 and the third conductor 18 constitute one resonator.

In the unit structure 10, the third conductor 18 and the fourth conductor 20 are magnetically or capacitively connected. The third conductor 18 and the fourth conductor 20 constitute one resonator.

In the unit structure 10, three resonators are decoded using the first conductor 14 to the fourth conductor 20. The unit structure 10 can function as one or more of a phase shift filter, a band-pass filter, a high-pass filter, and a low-pass filter depending on the propagation characteristics of the three resonators.

Variation of First Embodiment

A variation of the first embodiment is described. For example, the unit structure 10 illustrated in FIG. 2 has a structure in which the connection conductor 22 penetrates the second conductor 16 and the third conductor 18, but the first embodiment is not limited thereto.

Figure 5:
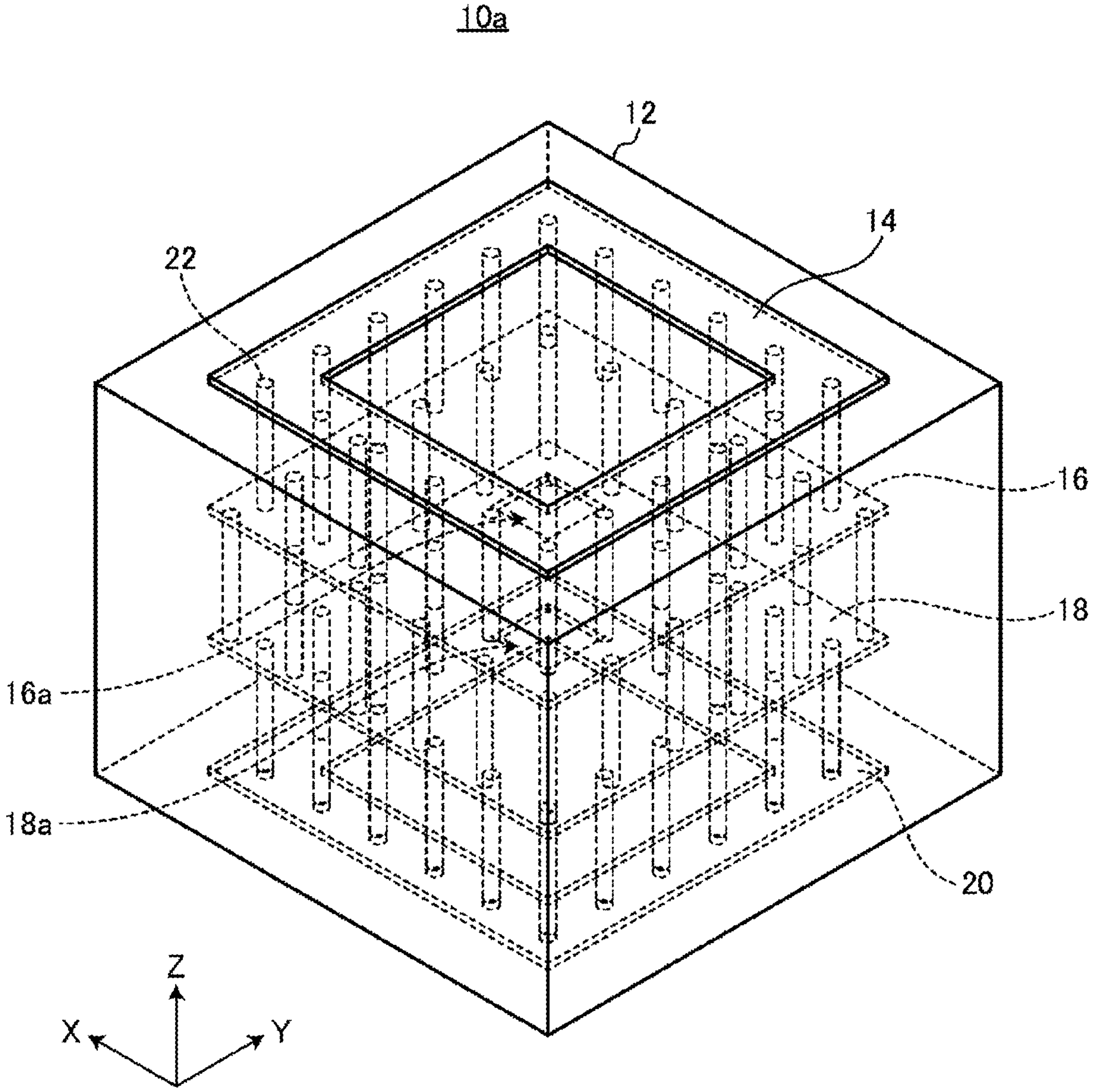
FIG. 5 is a diagram illustrating a configuration example of a unit structure according to a first example of a variation of the first embodiment.

FIG. 5 is a diagram illustrating a configuration example of a unit structure according to a first example of a variation of the first embodiment. As in a unit structure 10*a* illustrated in FIG. 5, some of the connection conductors 22 disposed between the second conductor 16 and the third conductor 18 may be disposed outside some of the connection conductors 22 disposed between the first conductor 14 and the second conductor 16.

With this arrangement, the region surrounded by the second conductor 16 and the connection conductor 22 of the third conductor is widened. As a result, the wavelength of the corresponding electromagnetic wave can be increased.

Figure 6:
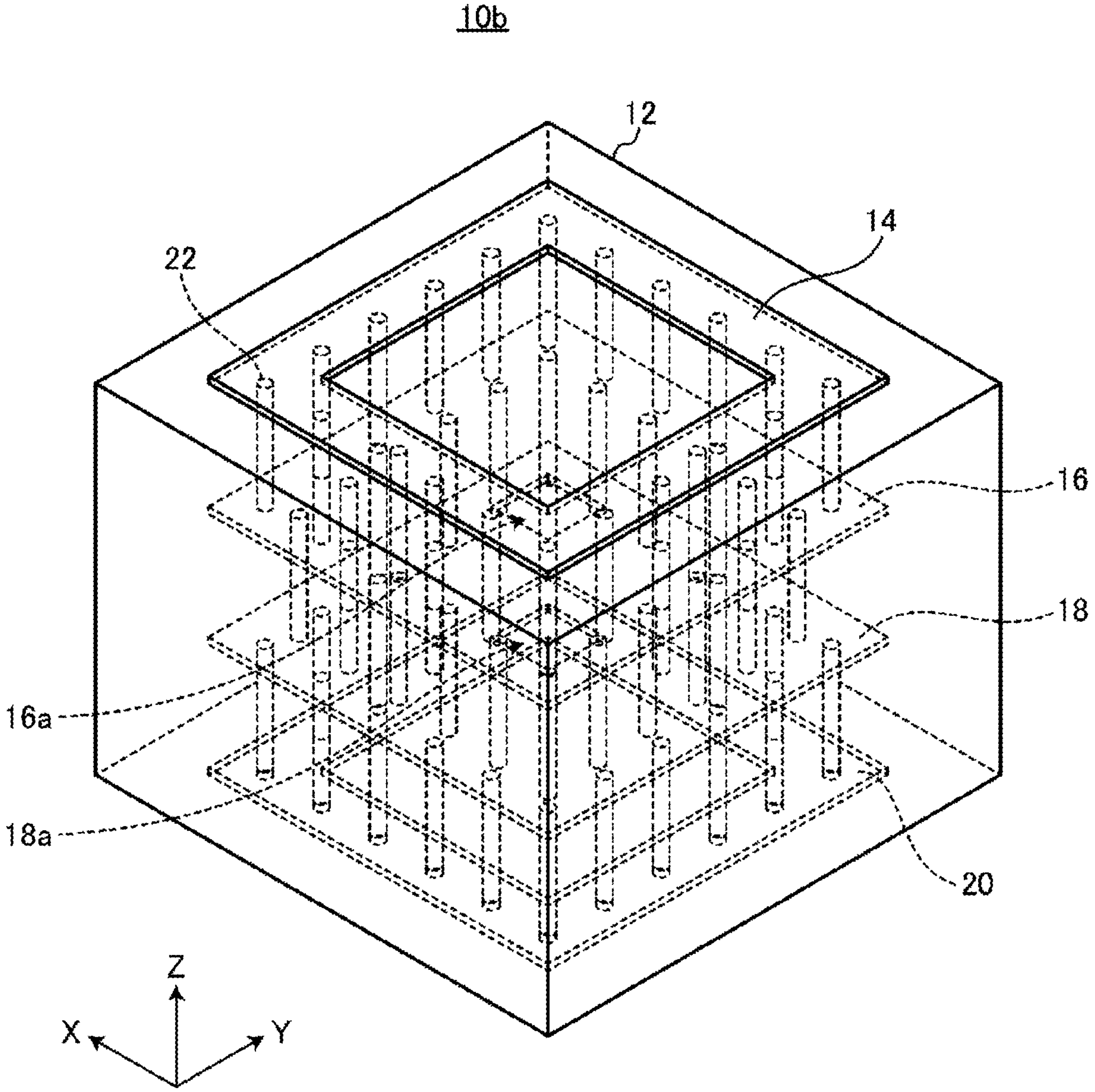
FIG. 6 is a diagram illustrating a configuration example of a unit structure according to a second example of the variation of the first embodiment.

FIG. 6 is a diagram illustrating a configuration example of a unit structure according to a second example of the variation of the first embodiment. As in a unit structure 10*b* illustrated in FIG. 6, contrary to the unit structure 10*a* illustrated in FIG. 5, a part of the connection conductors 22 disposed between the second conductor 16 and the third conductor 18 may be disposed inside a part of the connection conductors 22 disposed between the first conductor 14 and the second conductor 16. As a result, the wavelength of the electromagnetic wave corresponding to the region surrounded by the second conductor 16 and the connection conductor 22 of the third conductor can be conversely shortened.

Radio Wave Refracting Plate

Figure 7:
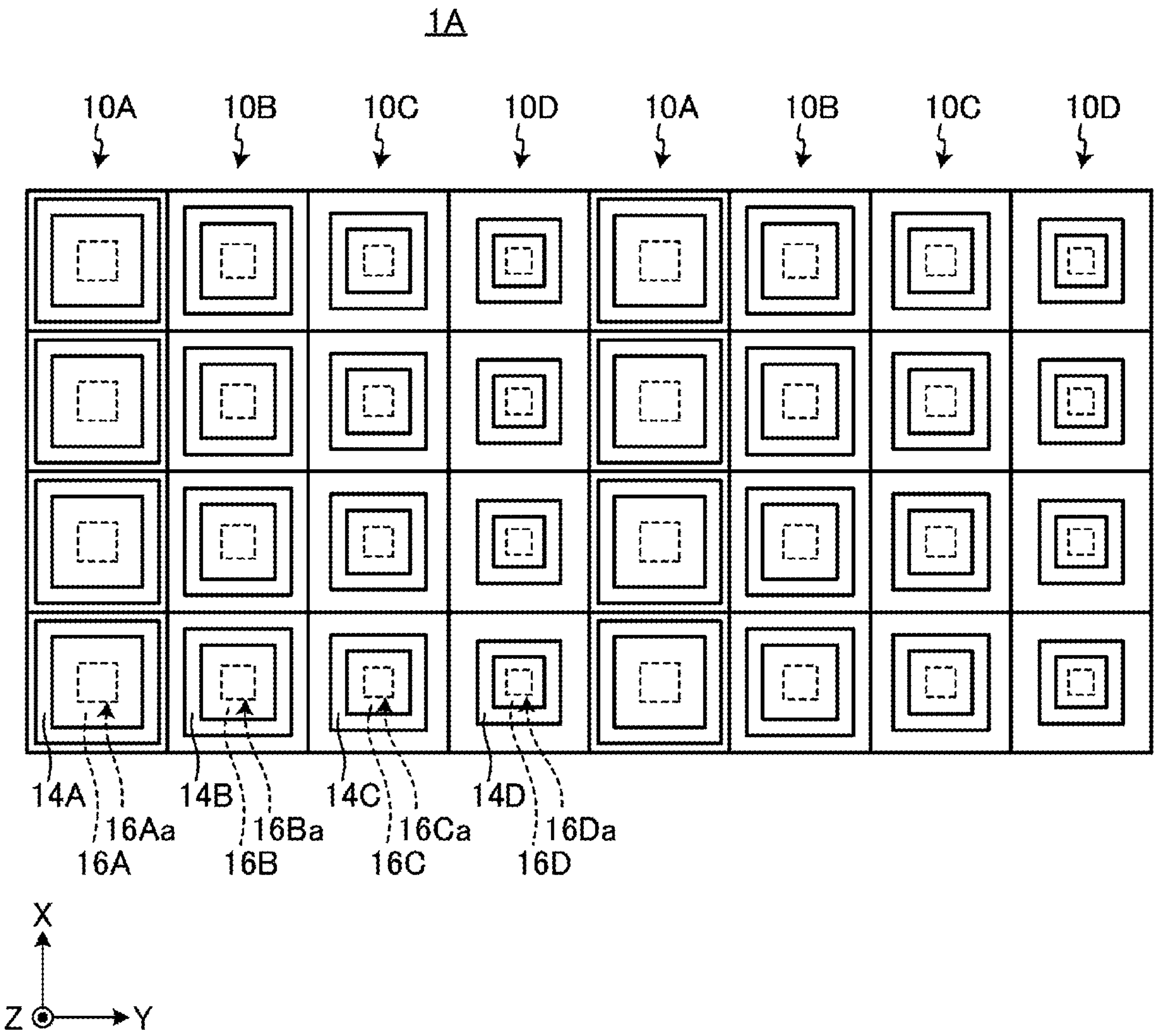
FIG. 7 is a diagram illustrating a configuration example of a radio wave refracting plate according to the first embodiment.

A configuration example of the radio wave refracting plate according to the first embodiment will be described with reference to FIG. 7. FIG. 7 is a diagram illustrating a configuration example of the radio wave refracting plate according to the first embodiment.

As illustrated in FIG. 7, a radio wave refracting plate 1A includes a plurality of unit structures 10A, a plurality of unit structures 10B, a plurality of unit structures 10C, and a plurality of unit structures 10D. The unit structures 10A, the unit structures 10B, the unit structures 10C, and the unit structures 10D are two-dimensionally arranged in the XY plane. The unit structures 10A, the unit structures 10B, the unit structures 10C, and the unit structures D are arranged in a lattice shape in the XY plane. The unit structures 10A, the unit structures 10B, the unit structures 10C, and the unit structures 10D are configured to change the phases of incident electromagnetic waves and emit the electromagnetic waves. In the radio wave refracting plate 1A, two unit structures adjacent to each other in the X direction or the Y direction which is an in-plane direction of the XY plane are configured to have different phase differences for shifting the phases of the incident electromagnetic waves.

In the example illustrated in FIG. 7, the plurality of unit structures 10A are arranged in a first column along the X direction of the radio wave refracting plate 1A. The plurality of unit structures 10B are arranged in a second column along the X direction of the radio wave refracting plate 1A. The plurality of unit structures 10C are arranged in a third column along the X direction of the radio wave refracting plate 1A. The plurality of unit structures 10D are arranged in the fourth column along the X direction of the radio wave refracting plate 1A. The plurality of unit structures 10A are arranged in a fifth column along the X direction of the radio wave refracting plate 1A. The plurality of unit structures 10B are arranged in a sixth column along the X direction of the radio wave refracting plate 1A. The plurality of unit structures 10C are arranged in a seventh column along the X direction of the radio wave refracting plate 1A. The plurality of unit structures 10D are arranged in an eighth column along the X direction of the radio wave refracting plate 1A.

The second conductor 16A of the unit structure 10A has a coupling hole 16Aa. The second conductor 16B of the unit structure 10B has a coupling hole 16Ba. The second conductor 16C of the unit structure 10C has a coupling hole 16Ca. The second conductor 16D of the unit structure 10D has a coupling hole 16Da.

The unit structures 10A to 10D are different from each other in terms of the outer diameter of each conductor. The outer diameter of each conductor decreases in the order of the unit structure 10A, the unit structure 10B, the unit structure 10C, and the unit structure 10D. In addition, the coupling hole 16Aa, the coupling hole 16Ba, the coupling hole 16Ca, and the coupling hole 16Da are configured to be smaller in this order.

That is, the unit structures 10A to 10D are configured to have different resonance frequencies. That is, in the radio wave refracting plate 1A, the amounts of change in phase are changed by changing the resonance frequencies in accordance with the positions at which the unit structures are arranged.

In the present embodiment, in the example illustrated in FIG. 7, four unit structures of the unit structure 10A, the unit structure 10B, the unit structure 10C, and the unit structure 10D are configured to change the phases of the electromagnetic waves incident on the radio wave refracting plate 1A by 360°.

Figure 8:
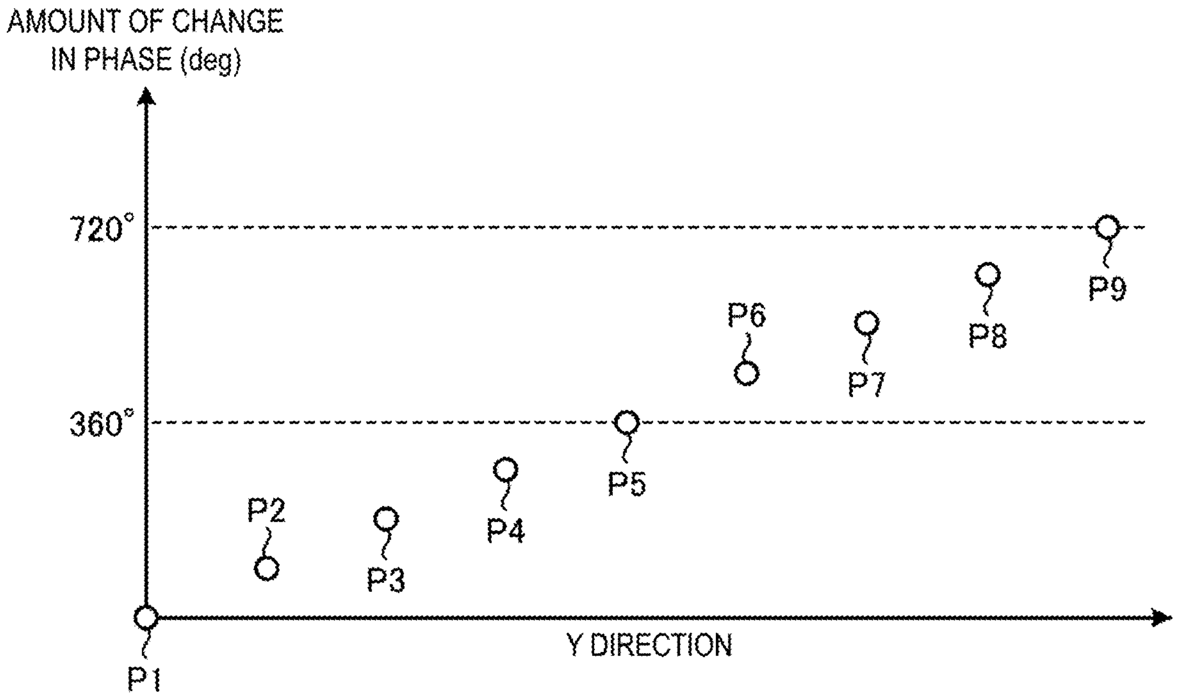
FIG. 8 is a diagram illustrating amounts of change in phase of the unit structure according to the first embodiment.

The amounts of change in phase of the unit structure according to the first embodiment will be described with reference to FIG. 8. FIG. 8 is a diagram for illustrating the amounts of change in phase of the unit structure.

In the present embodiment, in the example illustrated in FIG. 7, four unit structures of the unit structure 10A, the unit structure 10B, the unit structure 10C, and the unit structure 10D are configured to change the phases of the electromagnetic waves incident on the radio wave refracting plate 1A by 360°. FIG. 8 illustrates the amount of change in phase in the Y-axis direction. To be more specific, FIG. 8 illustrates an example in which a plane wave that has arrived at the radio wave refracting plate 1A is refracted in the same direction as the plane wave and emitted. A point P1 indicates the phase of the incident electromagnetic wave, and the amount of change in phase is 0°. A point P2 indicates the amount of change in phase of the first unit structure 10A in the Y-axis direction, and the amount of change in phase is 90°. A point P3 indicates the amount of change in phase of the first unit structure 10B in the Y-axis direction, and the amount of change in phase is 180°. A point P4 indicates the amount of change in phase of the first unit structure 10C in the Y-axis direction, and the amount of change in phase is 270°. A point P5 indicates the amount of change in phase of the first unit structure 10D in the Y-axis direction, and the amount of change in phase is 360°. A point P6, a point P7, a point P8, and a point P9 indicate the amounts of change in phase of a second unit structure 10A, a second unit structure 10B, a second unit structure 10C, and a second unit structure 10D, respectively. The amounts of change in phase of the second unit structure 10A, the second unit structure 10B, the second unit structure 10C, and the second unit structure 10D are 450°, 540°, 630°, and 720°, respectively. That is, in the present embodiment, the four unit structures of the unit structure 10A, the unit structure 10B, the unit structure 10C, and the unit structure 10D change the phases of the electromagnetic waves arriving at the radio wave refracting plate 1A by 360°.

The unit structure 10 may be referred to as a unit cell. For example, each of the unit structures 10A, 10B, 10C, and 10D may be referred to as a unit cell. A repeating unit in which a plurality of unit cells having different structures is arranged may be referred to as a supercell. For example, arrangement of the unit structures 10A, 10B, 10C, and 10D may be referred to as a supercell. The supercell may have a function, such as causing the phase change from 0° to 360°. The area of the radio wave refracting plate 1 may be increased by forming the supercell as a cell of one unit. Note that the unit of phase change that may be the supercell is not limited to from 0° to 360°, and one unit may be from 0° to 360°×n times (where n is a natural number).

That is, in the example illustrated in FIG. 7, the plurality of unit structures arranged in the Y-axis direction are configured such that the phase differences with respect to the reference unit structure (for example, the unit structure 10A) increase in the Y direction or the −Y direction. In the example illustrated in FIG. 7, in the plurality of unit structures arranged in the Y-axis direction, the phase difference is configured such that the phase advances or retards by a first phase difference (for example, 90°) as the phase advances in the Y direction or the −Y direction.

In the radio wave refracting plate 1A, when an interval between adjacent unit structures is d, a difference between the adjacent amounts of change in phase is $\Delta\Phi$, an angle at which the electromagnetic wave arriving at the radio wave refracting plate 1A is refracted is $\theta$, and a wave number of the electromagnetic wave arriving at the radio wave refracting plate 1A is k, the relationship of "$\Delta\Phi = kd \sin \theta$" is established. In the example in FIG. 8, a gradient of the amount of change in phase is depicted as the Y-axis direction, but the present disclosure is not limited thereto. In the present disclosure, the refraction direction can be arbitrarily designed by setting the gradient of the amount of change in phase to any direction. In the example in FIG. 8, the amount of change in phase is depicted as a linear change, but the present disclosure is not limited thereto. In the present disclosure, for example, changing the gradient of the amount of change in phase to a curve allows the plane wave arriving at the radio wave refracting plate 1A to converge to any place or to diffuse.

In the example illustrated in FIG. 8, the phase difference between the electromagnetic waves emitted from the two unit structures adjacent to each other in the X-axis direction is 90°, but the present disclosure is not limited thereto. The phase difference between the electromagnetic waves radiated from two adjacent unit structures may be, for example, 30°, 45°, or 60°. That is, the phase difference between the electromagnetic waves radiated from two adjacent unit structures may be arbitrary.

In the example illustrated in FIG. 8, each of the phase difference between the electromagnetic waves radiated by the unit structure 10A and the unit structure 10B, the phase difference between the electromagnetic waves radiated by the unit structure 10B and the unit structure 10C, the phase difference between the electromagnetic waves radiated by the unit structure 10C and the unit structure 10D, and the phase difference between the electromagnetic waves radiated by the unit structure 10D and the unit structure 10A are the same, 90°, but the present disclosure is not limited thereto. The respective phase difference of the electromagnetic waves radiated by the unit structure 10A and the unit structure 10B, the phase difference of the electromagnetic waves radiated by the unit structure 10B and the unit structure 10C, the phase difference of the electromagnetic waves radiated by the unit structure 10C and the unit structure 10D, and the phase difference of the electromagnetic waves radiated by the unit structure 10D and the unit structure 10A may be different. The phase difference of the electromagnetic waves radiated by the unit structure 10A and the unit structure 10B, the phase difference of the electromagnetic waves radiated by the unit structure 10B and the unit structure 10C, the phase difference of the electromagnetic waves radiated by the unit structure 10C and the unit structure 10D, and the phase difference of the electromagnetic waves radiated by the unit structure 10D and the unit structure 10A only need to be set according to design, usage, and/or the like.

As described above, in the first embodiment, the plurality of unit structures having different outer diameter dimensions from the first conductor 14 to the fourth conductor 20 are two-dimensionally arranged to change the phase of the arriving electromagnetic wave by 360°. Thus, in the first embodiment, repeating the sets of arrays to change the phase of the arriving electromagnetic wave by 360° makes it possible to increase the area of the radio wave refracting plate 1A.

Second Embodiment

Figure 9:
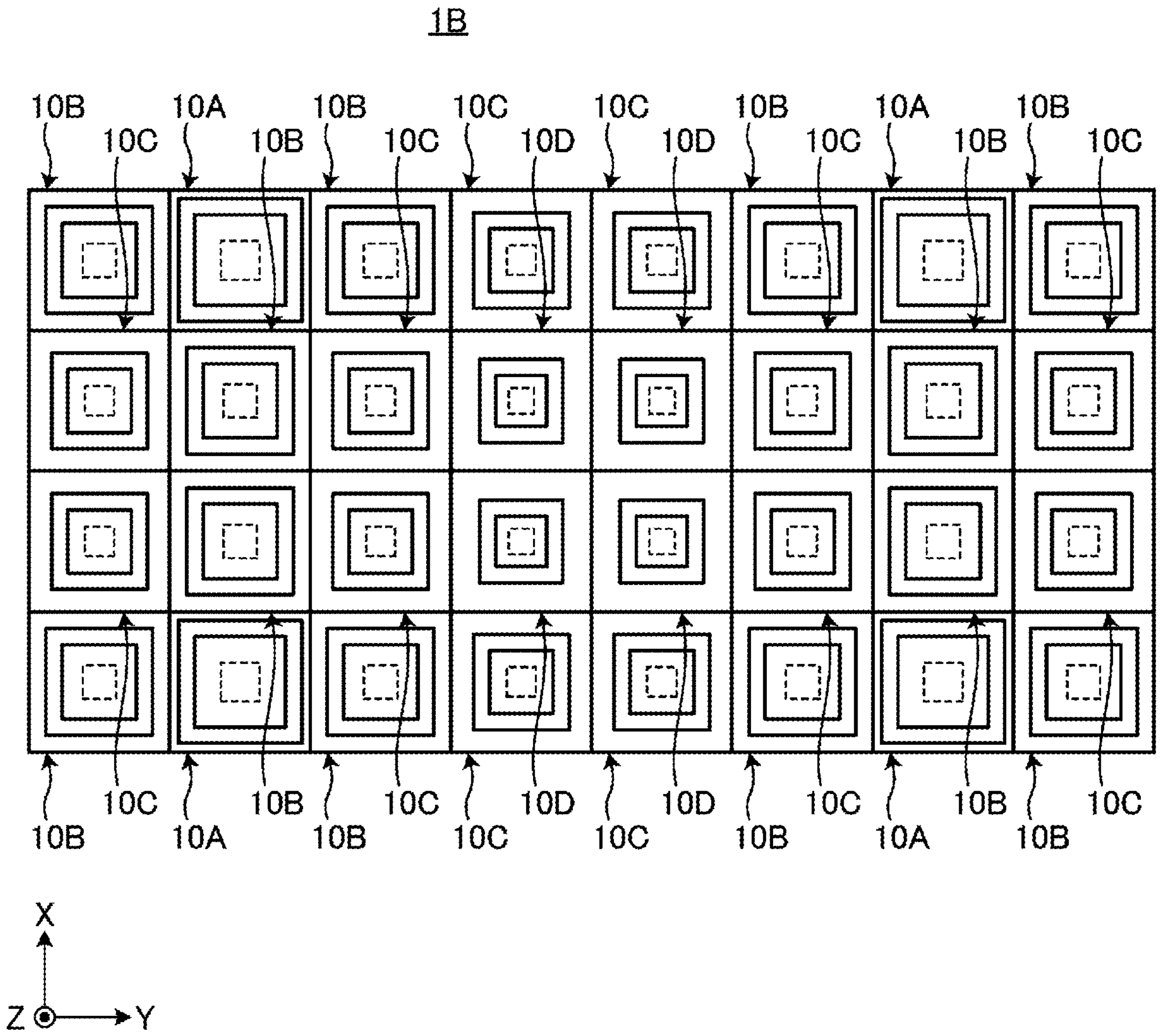
FIG. 9 is a diagram illustrating a configuration example of a radio wave refracting plate according to a second embodiment.

A configuration example of the radio wave refracting plate according to the second embodiment will be described with reference to FIG. 9. FIG. 9 is a diagram illustrating a configuration example of the radio wave refracting plate according to the second embodiment.

As illustrated in FIG. 9, a radio wave refracting plate 1B according to the second embodiment includes a plurality of unit structures 10A, a plurality of unit structures 10B, a plurality of unit structures 10C, and a plurality of unit structures 10D. The unit structures 10A to 10D are different from the radio wave refracting plate 1A shown in FIG. 7 in that they are arranged radially in the XY plane.

In the example illustrated in FIG. 9, in the first row of the radio wave refracting plate 1B along the Y direction, the unit structure 10B, the unit structure 10A, the unit structure 10B, the unit structure 10C, the unit structure 10C, the unit structure 10B, the unit structure 10A, and the unit structure 10B are arranged in this order.

In the example illustrated in FIG. 9, in the second row of the radio wave refracting plate 1B along the Y direction, the unit structure 10C, the unit structure 10B, the unit structure 10C, the unit structure 10D, the unit structure 10D, the unit structure 10C, the unit structure 10B, and the unit structure 10C are arranged in this order.

In the example illustrated in FIG. 9, in the third row of the radio wave refracting plate 1B along the Y direction, the unit structure 10C, the unit structure 10B, the unit structure 10C, the unit structure 10D, the unit structure 10D, the unit structure 10C, the unit structure 10B, and the unit structure 10C are arranged in this order.

In the example illustrated in FIG. 9, in the fourth row of the radio wave refracting plate 1B along the Y direction, the unit structure 10B, the unit structure 10A, the unit structure 10B, the unit structure 10C, the unit structure 10C, the unit structure 10B, the unit structure 10A, and the unit structure 10B are arranged in this order.

That is, four unit structures 10E having the smallest outer diameter dimensions of the first conductor 14 to the fourth conductor 20 among the unit structures 10A to 10D are arranged in the central region of the radio wave refracting plate 1B. In the radio wave refracting plate 1B, the unit structures 10A, the unit structures 10B, and the unit structures 10C are radially arranged around the four unit structures 10D.

In the example illustrated in FIG. 9, four unit structures from the unit structure 10A to the unit structure 10D are configured to change the phases of the electromagnetic waves incident on the radio wave refracting plate 1B by 360°. In the plurality of unit structures arranged in the first radiation direction of the XY plane in the radio wave refracting plate 1B, the phase difference increases with respect to a reference unit structure (for example, the unit structure 10D) as the positions advance in a direction from the center toward the outside or a direction from the outside toward the center. The radio refractive plate 1B is configured such that the phase difference advances or slows down by a phase difference (for example, 90°) for each advance in a direction from the center to the outside or a direction from the outside toward the center.

As described above, in the second embodiment, the plurality of unit structures having different outer diameter dimensions from the first conductor 14 to the fourth conductor 20 are two-dimensionally and radially arranged to change the phase of the arriving electromagnetic wave by 360°. Thus, in the first embodiment, repeating the sets of arrays to change the phase of the arriving electromagnetic wave by 360° makes it possible to increase the area of the radio wave refracting plate 1B.

Third Embodiment

A third embodiment is described.

In the first embodiment, it has been described that a plurality of unit structures having different outer diameter dimensions from the first conductor 14 to the fourth conductor 20 are arranged in the radio wave refracting plate 1A, like the unit structure 10A to the unit structure 10D, but the present disclosure is not limited thereto. In the present disclosure, for example, in the radio wave refracting plate 1A, the unit structures may be arranged while changing the height along the Y-axis direction.

Figure 10:
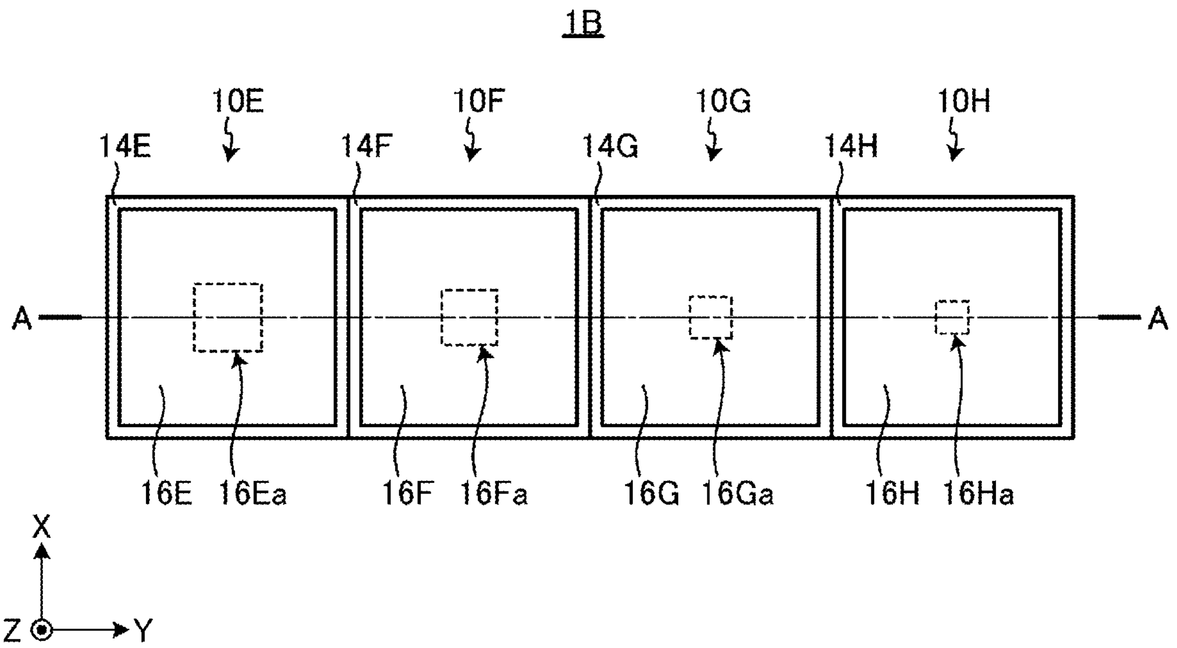
FIG. 10 is a top view illustrating a configuration example of a radio wave refracting plate according to a third embodiment.
Figure 11:
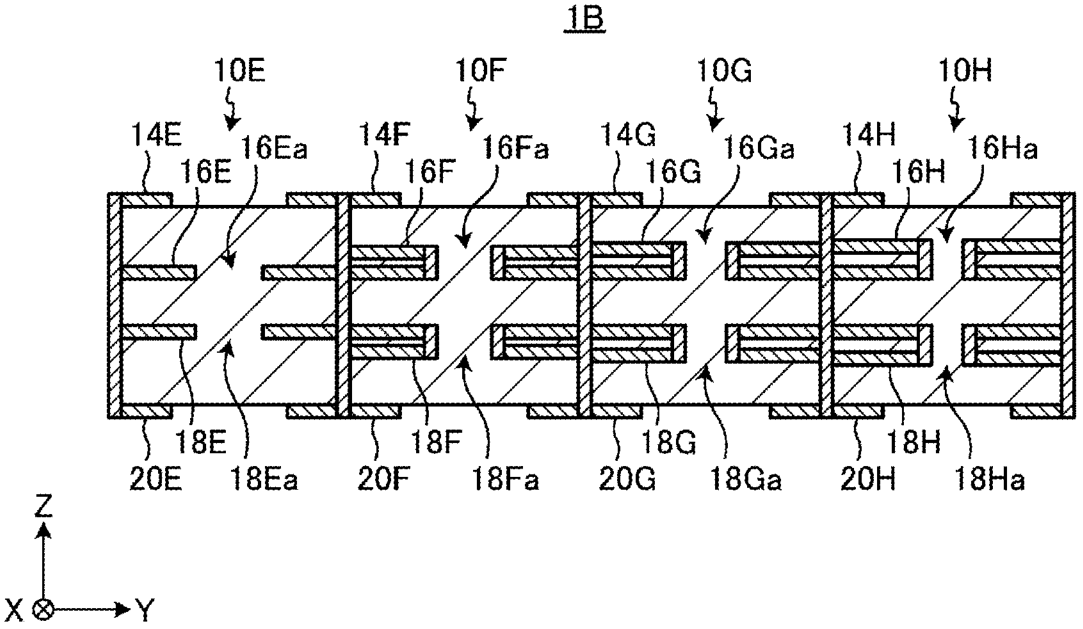
FIG. 11 is a cross-sectional view illustrating a configuration of a radio wave refracting plate according to the third embodiment.

A configuration example of the radio wave refracting plate according to the third embodiment will be described with reference to FIGS. 10 and 11. FIG. 10 is a top view illustrating a configuration example of a radio wave refracting plate according to a third embodiment. FIG. 11 is a cross-sectional view illustrating a configuration of a radio wave refracting plate according to the third embodiment.

As illustrated in FIG. 10, the radio wave refracting plate 1B includes a unit structure 10E, a unit structure 10F, a unit structure 10G, and a unit structure 10H. For example, the height may be decreased in the order of the unit structure 10E, the unit structure 10F, the unit structure 10G, and the unit structure 10H.

FIG. 11 is a cross-sectional view taken along line A-A in FIG. 10. As illustrated in FIG. 11, the unit structure 10E includes a first conductor 14E, a second conductor 16E, a third conductor 18E, and a fourth conductor 20E. The first to fourth conductors 14E to 20E are electromagnetically connected to each other by connection conductors (not illustrated).

Each of the second conductor 16E and the third conductor 18E is formed of one conductor. The second conductor 16E has a coupling hole 16Ea. The third conductor 18E has a coupling hole 18Ea. The shape and size of the coupling hole 16Ea and the coupling hole 18Ea may be the same.

As illustrated in FIG. 11, the unit structure 10F includes a first conductor 14F, a second conductor 16F, a third conductor 18F, and a fourth conductor 20F. The first to fourth conductors 14F to 20F are electromagnetically connected to each other by connection conductors (not illustrated).

The first conductor 14F and the fourth conductor 20F have the same shapes as the first conductor 14E and the fourth conductor 20E of the unit structure 10E, respectively.

Each of the second conductor 16F and the third conductor 18F has a two-layer structure in which two conductors face each other. The second conductor 16F has a coupling hole 16Fa. The third conductor 18F has a coupling hole 18Fa. The shape and size of the coupling hole 16Fa and the coupling hole 18Fa may be the same.

The heights of the second conductor 16F and the third conductor 18F are greater than the heights of the second conductor 16E and the third conductor 18E of the unit structure 10E, respectively. The sizes of the coupling hole 16Fa and the coupling hole 18Fa are smaller than those of the coupling hole 16Ea and the coupling hole 18Ea of the unit structure 10E, respectively.

As illustrated in FIG. 11, the unit structure 10G includes a first conductor 14G, a second conductor 16G, a third conductor 18G, and a fourth conductor 20G. The first to fourth conductors 14G to 20G are electromagnetically connected to each other by connection conductors (not illustrated).

The first conductor 14G and the fourth conductor 20G have the same shape as the first conductor 14E and the fourth conductor 20E of the unit structure 10E, respectively.

Each of the second conductor 16G and the third conductor 18G has a two-layer structure in which two conductors face each other. The second conductor 16G has a coupling hole 16Ga. The third conductor 18G has a coupling hole 18Ga. The shape and size of the coupling hole 16Ga and the coupling hole 18Ga may be the same.

The heights of the second conductor 16G and the third conductor 18G are greater than the heights of the second conductor 16F and the third conductor 18F of the unit structure 10F, respectively. The sizes of the coupling hole 16Ga and the coupling hole 18Ga are smaller than those of the coupling hole 16Fa and the coupling hole 18Fa of the unit structure 10F, respectively.

As illustrated in FIG. 11, the unit structure 10H includes a first conductor 14H, a second conductor 16H, a third conductor 18H, and a fourth conductor 20H. The first to fourth conductors 14H to 20H are electromagnetically connected to each other by connection conductors (not illustrated).

The first conductor 14H and the fourth conductor 20H have the same shape as the first conductor 14E and the fourth conductor 20E of the unit structure 10E, respectively.

Each of the second conductor 16H and the third conductor 18H has a two-layer structure in which two conductors face each other. The second conductor 16H has a coupling hole 16Ha. The third conductor 18H has a coupling hole 18Ha. The shape and size of the coupling hole 16Ha and the coupling hole 18Ha may be the same.

The heights of the second conductor 16H and the third conductor 18H are greater than the heights of the second conductor 16G and the third conductor 18G of the unit structure 10G, respectively. The sizes of the coupling hole 16Ha and the coupling hole 18Ha are smaller than those of the coupling hole 16Ga and the coupling hole 18Ga, respectively.

In the third embodiment, by changing the height from the second conductor 16E to the second conductor 16H and the height from the third conductor 18E to the third conductor 18H, the height dimensions from the unit structure 10E to the unit structure 10H are the same.

In the third embodiment, the unit structures 10E to 10H can be two-dimensionally arranged. For example, the unit structures 10E to 10H may be arranged in a lattice pattern or in a radial pattern like the unit structures 10A to 10D illustrated in FIGS. 7 and 9.

As described above, in the third embodiment, a plurality of unit structures having different height dimensions are two-dimensionally arranged to change the phase of an arriving electromagnetic wave by 360°. Thus, in the first embodiment, repeating the sets of arrays to change the phase of the arriving electromagnetic wave by 360° makes it possible to increase the area of the radio wave refracting plate.

The embodiments of the present disclosure have been described above, and the elements of the embodiments function as a spatial filter. As a result, the design can be facilitated by controlling the phase by frequency shifting the spatial filter. This eliminates the need for the elements of the transmission plate to have a similar shape, and, even when elements of various embodiments are mixed, the elements can function as a transmission plate. In this case, as a property of a general filter, when the number of stages and coupling between the elements are determined, a phase as a normalized filter is also determined. That is, the initial phase of the filter can be changed depending in whether the coupling of the resonators is inductive or capacitive. For example, in the spatial filter, making the low-phase side of the element of the transmission plate capacitive and the high-phase side inductive may facilitate the design. For example, in the spatial filter, the design may be facilitated by making the low-phase side of the element of the transmission plate inductive and the high-phase side capacitive. The boundary between the low-phase side and the high-phase side is not limited to 180°, and various angles, such as 120°, 135°, 150°, 210°, 225°, and 240°, may be employed. When the phase range in one supercell of the spatial filter is from 0° to 360°×n, a plurality of phase boundaries may be included. The boundaries of the plurality of phases are not limited to a single angle and may be independent.

Embodiments of the present disclosure have been described above, but the present disclosure is not limited by the contents of the embodiments. Constituent elements described above include those that can be easily assumed by a person skilled in the art, those that are substantially identical to the constituent elements, and those within a so-called range of equivalency. The constituent elements described above can be combined as appropriate. Various omissions, substitutions, or modifications of the constituent elements can be made without departing from the spirit of the above-described embodiments.

The invention claimed is:

1. A composite resonator comprising:

a first conductor extending in a first plane direction;

a second conductor separated from the first conductor in a first direction and extending in the first plane direction;

a third conductor separated from the second conductor in the first direction and extending in the first plane direction;

a fourth conductor separated from the third conductor in the first direction and extending in the first plane direction; and a plurality of connection conductors parallel to the first direction, the plurality of connection conductors being provided along a periphery of the first conductor, the second conductor, the third conductor, and the fourth conductor, wherein the plurality of connection conductors are configured to electromagnetically connect the first conductor, the second conductor, the third conductor, and the fourth conductor.

2. The composite resonator according to claim 1, wherein the first conductor and the second conductor are magnetically or capacitively connected to each other, the second conductor and the third conductor are magnetically or capacitively connected to each other, and the third conductor and the fourth conductor are magnetically or capacitively connected to each other.

3. The composite resonator according to claim 1, wherein an interval between the connection conductors adjacent to each other is equal to or less than a wavelength of a received radio wave.

4. The composite resonator according to claim 3, wherein an interval between the connection conductors adjacent to each other is equal to or less than a half wavelength of the received radio wave.

5. The composite resonator according to claim 1, wherein the second conductor and the third conductor have a coupling hole configured to magnetically or capacitively connect the first conductor and the fourth conductor to each other.

6. The composite resonator according to claim 1, wherein the first conductor and the fourth conductor are configured to have a frame shape.

7. A radio wave refracting plate comprising:

a plurality of the composite resonators according to claim 1, wherein the plurality of composite resonators are arranged in the first plane direction.

* * * * *